(12) United States Patent
Egger

(10) Patent No.: US 11,638,478 B2
(45) Date of Patent: May 2, 2023

(54) CABLE MANAGEMENT SYSTEM AND WORKSTATION SYSTEM

(71) Applicant: YAASA GmbH, Deutschlandsberg (AT)

(72) Inventor: Stephan Egger, Speicher (CH)

(73) Assignee: YAASA GmbH, Deutschlandsberg (AT)

( * ) Notice: Subject to any disclaimer, the term of this patent is extended or adjusted under 35 U.S.C. 154(b) by 0 days.

(21) Appl. No.: 17/318,216

(22) Filed: May 12, 2021

(65) Prior Publication Data
US 2021/0353050 A1    Nov. 18, 2021

(30) Foreign Application Priority Data

May 13, 2020   (DE) ..................... 10 2020 112 989.0

(51) Int. Cl.
*F16L 3/10* (2006.01)
*A47B 21/06* (2006.01)

(52) U.S. Cl.
CPC ............ *A47B 21/06* (2013.01); *F16L 3/1058* (2013.01); *F16L 3/1066* (2013.01)

(58) Field of Classification Search
USPC ...... 248/49, 51, 65, 67.7, 68.1, 70, 73, 74.4; 174/542, 681.1, 70 R
See application file for complete search history.

(56) References Cited

U.S. PATENT DOCUMENTS

| 5,669,590 | A  | * | 9/1997  | Przewodek    | F16L 3/1075 248/74.1 |
| 7,345,241 | B2 | * | 3/2008  | Caveney      | H01R 9/2416 174/99 R |
| 8,056,868 | B2 | * | 11/2011 | Vander Griend | F16L 3/1075 248/68.1 |

(Continued)

FOREIGN PATENT DOCUMENTS

| DE | 3634999 A1    | 4/1988 |
| DE | 202008013987 U1 | 3/2010 |

(Continued)

OTHER PUBLICATIONS

Microsoft Bing search engine, NVIS Antenna, American Partisan, May 18, 2019.*

(Continued)

*Primary Examiner* — Alfred J Wujciak
(74) *Attorney, Agent, or Firm* — Eschweiler & Potashnik, LLC

(57) ABSTRACT

A cable management system for a worktop has a cable support and at least one support mechanism comprising a base body, a first lever and a second lever. The base body is elongated between first and second ends along a major axis and includes respective pivot and fixation points for the first and second levers. The first lever is at a proximal end pivotally supported in the first pivot point, comprises at least a first retaining portion for receiving the cable support, and is fixable at the first fixation point. The second lever is at a proximal end pivotally supportable in the second pivot point, comprises at least one second retaining portion for receiving the cable support, and is fixable at the second fixation point.

20 Claims, 6 Drawing Sheets

(56) References Cited

U.S. PATENT DOCUMENTS

| | | | | |
|---|---|---|---|---|
| 8,634,198 B2* | 1/2014 | Chen | ............... | H05K 7/1491 |
| | | | | 361/740 |
| 9,038,247 B2* | 5/2015 | Dodge | ............. | F16B 2/10 |
| | | | | 248/68.1 |
| 2004/0146331 A1 | 7/2004 | McNestry | | |
| 2010/0024687 A1 | 2/2010 | Preiss | | |
| 2016/0134089 A1* | 5/2016 | Peterson | ........... | B60R 16/0207 |
| | | | | 174/72 A |
| 2021/0075204 A1* | 3/2021 | Daude | ............ | F16L 3/1033 |

FOREIGN PATENT DOCUMENTS

| | | |
|---|---|---|
| DE | 202010005840 U1 | 8/2010 |
| DE | 202019100434 U1 | 6/2019 |

OTHER PUBLICATIONS

Humanscale; "NeatTech"; https://www.humanscale.com/products/cable-managementtools/neattech; Apr. 9, 2020.
ELIOT; "Eliot Schreibtisch—das Original"; https://eliotfurniture.com/products/eliot?variant=30716797157433; Apr. 8, 2020.
Amazon.com; "Metal Desk Cable Grommet for Holding Socket Rails/Cable . . . "; Gedotec; https://amazon.de/Kabelkanal-Schreibtisch-Kabeldurchlass-Steckdosenleisten (Gedo-63103221); Apr. 8, 2020.
Ikea; "Ikea SIGNUM Cable trunking horizontal"; https://www.ikea.com/at/de/p/signum-kabelkanal-waagerechtsilberfarben-30200253; Apr. 8, 2020.
Inwerk; "XXL Cable Manager"; https://www.inwerkbueromoebel.de/buerotische/hoehenverstellbareschreibtische/steh-sitzschreibtisch-masterlift2-swchrom-bm56947.html; Apr. 8, 2020.
Jiecang; "Electio electrification set"; https://www.schwarzwaldlab.de/basicworking/67/elektrifizierungsset; Apr. 8, 2020.

\* cited by examiner

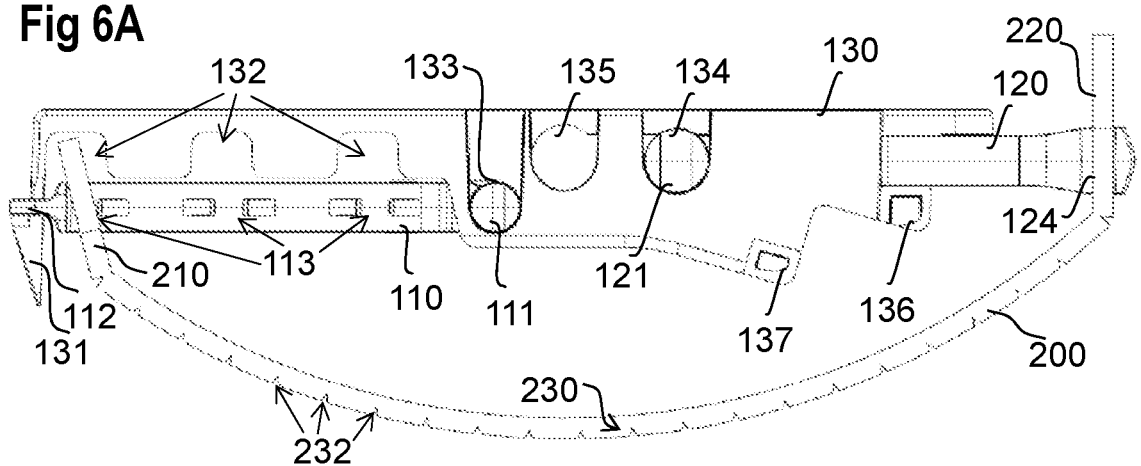
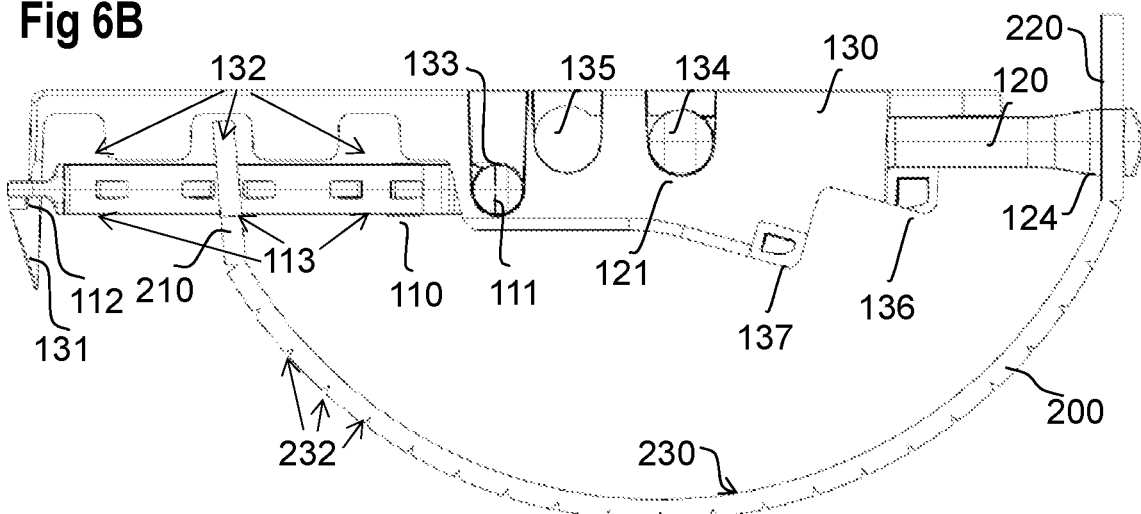
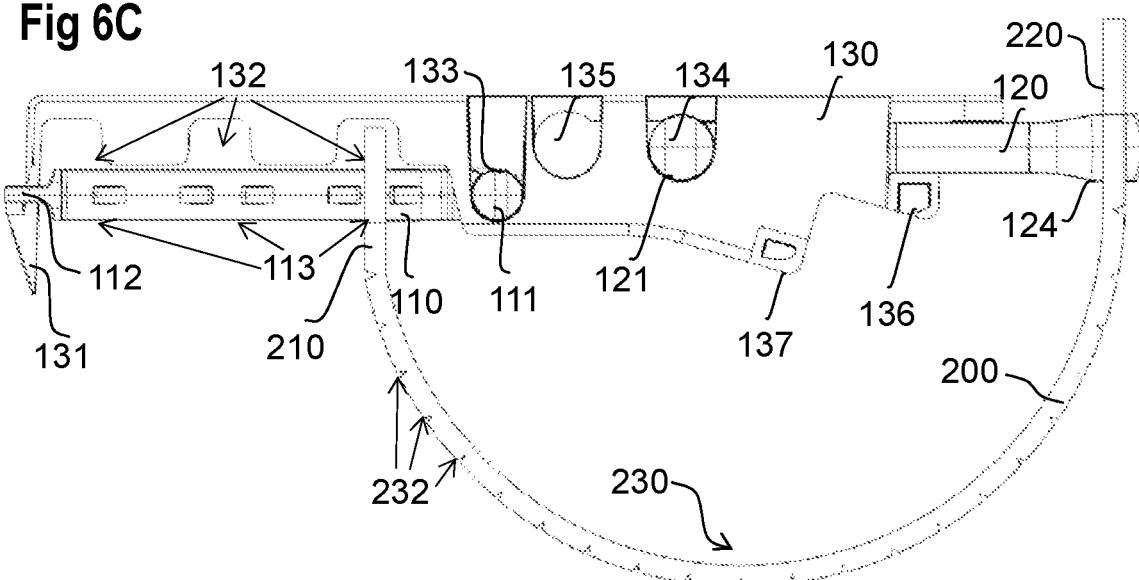

CABLE MANAGEMENT SYSTEM AND WORKSTATION SYSTEM

CROSS REFERENCE TO RELATED APPLICATIONS

This application claims priority to German Application number 10 2020 113 565.3 filed on May 19, 2020, the contents of which are incorporated by reference in their entirety.

FIELD

The present disclosure relates to a cable management system and to a workstation system with such a cable management system.

BACKGROUND

Even in modernly furnished office spaces, there are still very many devices at work tables that are connected to each other with cables or require a power or network connection. These include docking stations for notebooks, for example, which connect monitors (and often multiple monitors in CAD workstations), keyboards, mice, cameras, charging cables for cell phones, and so on. In addition, devices such as desk lamps, radio or telephone are often located on a work table.

If all these devices are connected by cables in a disorganized way, it can result in an unsightly appearance. Especially with height-adjustable desks, there is also always the risk of damaging the devices or at least knocking them off the desk by getting caught on cables while adjustment is in progress.

Depending on the working environment, the individual preferences of the user or even the activities performed at the workstation, there are different requirements for the organization of the cables. In CAD workstations, for example, a large number of cables need to be stowed away. In workplaces where work is done only with tablets, the number may be smaller.

In conventional solutions, various types of cable ducts or cable retainers are used, where the cables are routed over grids, nets or metal trays, for example. However, these prove inflexible in terms of the volume of cables to be accommodated and accessibility.

SUMMARY

The present disclosure provides an improved concept for cable routing at workstations, with which a higher flexibility for a user of the workstation can be achieved.

The improved concept is based on the idea of providing a cable management system flexibly with several basic components, namely with an areal cable support and one or more support mechanisms to which the cable support can be attached. In particular, the support mechanism is elongated along a major axis and comprises a first and a second lever, the pivots of which are mounted in a base body, in particular facing each other, so that the two levers allow the cable management system to be opened towards both outer sides. The cable support can be attached to the levers in each case. On the other end, the levers can also be fixed in the base body of the support mechanism, which can be used, for example, to close the cable management system if, for example, stowed cables are not to be visible. In various embodiments, the fixation points of the cable support to the levers and/or the pivot points of the levers can be varied to further increase the flexibility of the cable management system.

Accordingly, in accordance with one embodiment, a cable management system for a worktop in accordance with the improved concept comprises an areal cable support and at least one support mechanism comprising a base body, a first lever, and a second lever. The base body is elongated between a first end and a second end along a major axis. The base body comprises a first pivot point for the first lever, a second pivot point for the second lever, a first fixation point for the first lever, and a second fixation point for the second lever.

In this case, the first lever is at a proximal end pivotally mounted in the first pivot point, comprises at least a first retaining portion for receiving the cable support, and is fixable at the first fixation point. Similarly, the second lever can be rotatably mounted at a proximal end in the second pivot point, comprises at least one second retaining area for receiving the cable support and is fixable at the second fixation point.

By proximal end it is understood here in particular that the end is closer to the respective rotation point, while a respective distal end is opposite the proximal end of the lever.

For example, the proximal ends of the first and second levers face each other. In this case, a distal end of the first lever faces the first end of the base body and a distal end of the second lever faces the second end of the base body.

For example, in this case, the proximal ends of the levers are located in a central region between the two ends of the base body, while the distal ends are directed outwards, so to speak. This applies in particular to the fixed state of the levers.

In alternative embodiments, a proximal end of one of the levers may also face the distal end of the other lever. For example, only the proximal end of the second lever is arranged in a middle region between the two ends of the base body, while the proximal end of the first lever is supported in the region of the first end of the base body. As a further alternative, the distal ends may also face each other.

For example, the major axis of the base body is parallel to a surface or underside of a worktop to which the support mechanism may be attached.

A projection of the levers perpendicular to such an imaginary surface coincides with or is parallel to the major axis, for example, regardless of a respective angular position of the corresponding lever. By the projection of a lever is meant, of course, the projection of the respective corresponding linear components of the lever, regardless of an actual shape of the lever, which may differ for mechanical or manufacturing reasons.

In various embodiments, the first lever comprises at least one further retaining portion for receiving the cable support, which is spaced apart from the first retaining portion. For example, two, three or more retaining portions may be provided on the first lever to allow the cable support to be secured to the lever in different positions. This allows, for example, the volume that is formed between the cable support and the support mechanism to be varied. Thus, the volume can be selected to be larger or smaller as needed, for example, to accommodate a varying amount of cable to be stowed.

In various embodiments, the first and, if present, the at least one further retaining portion comprise at least one stopper configured for preventing displacement of the cable support on the first lever. For example, the cable support is slid onto the first lever through an opening in the cable support and is held in the respective retaining portion by the at least one stopper or a pair of stoppers.

For example, the stoppers are ramp-shaped or like a single saw tooth, so that the cable support can be pushed into the respective retaining portion with little effort, but it is more difficult to push it out of the retaining area. Preferably, however, the stopper or stoppers are designed in such a way that sliding the cable support out of the respective retaining portion is not fundamentally impossible. This further increases the flexible applicability of the cable management system.

When the cable support is pushed onto the first lever, it is possible that a region of the cable support, in particular an edge region surrounding the opening in the cable support, protrudes from the first lever or projects beyond the first lever. To accommodate such a possible condition, the base body comprises a respective recess in the fixed state of the first lever in the region of the first and, if present, of the at least one further retaining portion. Then, for example, when the first lever is appropriately fixed at the first fixation point, the region of the cable support that protrudes from the first lever or protrudes beyond the first lever can protrude into this recess.

In various embodiments, the first fixation point on the base body is formed by a first part of a first retaining device, in particular a snap-on device. Thereby, the distal end of the first lever comprises a second part of this first retaining device. The two parts of the first retaining device can be snapped into one another, for example, by snapping one part into the other. Preferably, this connection is thereby releasable in order to be able to move the first lever again and thus allow access for inserting or removing cables or the like onto the cable support. In addition to a snap-on device, other preferably reversible connections may also be used.

In various embodiments of the cable management system, the second fixation point is formed on the base body by a support. In this case, the second lever comprises a flexible part which is configured to rest on the support in a state of rest of the second lever and to prevent resting on the support in a state of release. Thus, for example, the second lever is fixed by the flexible part resting on the support of the base body. By the corresponding movement of the flexible part, the possibility of resting is prevented, so that a rotating movement of the second lever and thus, for example, access to the cable support is made possible. Again, other ways of fixing the second lever to the base body are also possible.

Due to the possibility of fixing the first and the second lever to the base body in any desired manner, respectively of moving the respective lever, the cable management system allows easy access to the cable support from both sides, for example in order to place cables on the cable support or to take them off the cable support. In particular, access is thus possible from diametrically opposite sides of the cable management system.

In various embodiments of the cable management system, the cable support comprises one or more openings in an edge region for receiving the first and/or second lever. The edge region may be formed by respective edges of the cable support, such as a first edge region and a second edge region, which together form the edge region of the cable support. For example, the first edge region comprises an opening through which the first lever can pass and which is eventually brought to be received in the first retaining portion or, if present, in the at least one further retaining portion. Similarly, a second edge portion of the cable support may comprise openings that may be applied to the distal end of the second lever to be received in the second retaining portion.

The cable support is formed, for example, from a rigid material, in particular a material that is resistant to bending. By bend-resistant, it is understood in particular that bending of the material is possible, but requires increased force. In particular, non-uniform, e.g. punctual, deformations of the material are not intended. In a central region, the cable support comprises a plurality of parallel slots which are aligned perpendicularly or substantially perpendicularly to the major axis. Preferably, the slots are formed such that they do not completely penetrate the material. Furthermore, the slots are preferably arranged on an outer side, i.e. a side facing away from the support mechanism.

The parallel slots thus allow direction-dependent curling of the cable support perpendicular to the course of the slots, while along the course of the slots the stiffness of the material is unchanged. Thus, on the one hand, the stiffness of the material combined with a high load-bearing capacity can be utilized and, on the other hand, a flexible movement of the cable support during opening by means of the first and/or second lever can be achieved. The material is formed, for example, with a felt material, in particular a plastic felt material.

The base body comprises, for example, a mounting arrangement for mounting the support mechanism to the worktop. For example, corresponding openings for screwing the base body to a worktop are provided for this purpose.

In various embodiments of the cable management system, the base body comprises a third pivot point for the second lever and a corresponding third fixation point. This allows the second lever to be pivotally supported at the proximal end in the third pivot point. Likewise, fixation at the third fixation point of the second lever may be possible. Depending on the desired volume or desired type of use of the cable management system, the second lever can thus be changed between two different pivot points, namely the second and third pivot points. The basic principle remains that the proximal ends of the first and second levers face each other, and the distal ends face the first and second ends of the base body.

For example, when the support mechanism is fixed under a worktop, the variable positioning of the second lever allows two different ways of using the cable system. In one position, the second lever can be mounted such that the distal end of the second lever and the cable support received therein remain completely below the countertop, regardless of an angle of rotation of the second lever. In the other position of the second lever, with unchanged positioning of the base body with respect to the worktop, the second lever can protrude over the corresponding edge of the worktop, so that the cable support ends in front of the edge, for example, or hides the edge. Thus, the user can flexibly adapt the cable management system to his needs by merely selecting the corresponding pivot point for the second lever. This can be supported, for example, by a simple snap mechanism to release the second lever from the corresponding pivot point and insert it into the other pivot point.

For example, an angle between the main axis and a connection of the second pivot point with the second fixation point is different from an angle between the main axis and a connection of the third pivot point and the third fixation point. Thus, for example, the angle for the described application above the edge is smaller than the angle for the application below the worktop.

Depending on the width of the cable support, i.e. the dimension perpendicular to the major direction, it may be sufficient to provide a single support mechanism for the cable management system if the cable support is sufficiently rigid. However, for larger widths, it may also be convenient to provide two or more corresponding support mechanisms for the cable management system. In this case, the support mechanisms are preferably arranged parallel to each other in order to enable, for example, uniform opening of the cable management system on both sides, i.e. with the first and second lever of each support mechanism.

The improved concept thus also relates to a workstation system with a worktop and a cable management system attached to the worktop in accordance with one of the embodiments described above.

For example, in this regard, the cable management system is provided with one or more support mechanisms comprising both the described second pivot point and a third pivot point for the second lever. In this regard, as previously described, the second lever is usable in a first configuration and a second configuration. In the first configuration, the second lever is supported in the second pivot point and the cable support protrudes beyond a lateral edge of the countertop when the second lever is fixed to the second fixation point. In the second configuration, the second lever is supported in the third pivot point and the cable support is located below the worktop when the second lever is fixed at the third fixation point.

BRIEF DESCRIPTION OF THE DRAWINGS

The improved concept is explained in more detail below by means of exemplary embodiments with reference to the drawings. Here, similar elements or elements with the same functions are designated with the same reference signs. Therefore, a repeated explanation of individual elements is dispensed with where appropriate.

In the drawings:

FIGS. 6A-6C are front views of an exemplary cable management system showing various configurations thereof.

DETAILED DESCRIPTION

Figure 1:
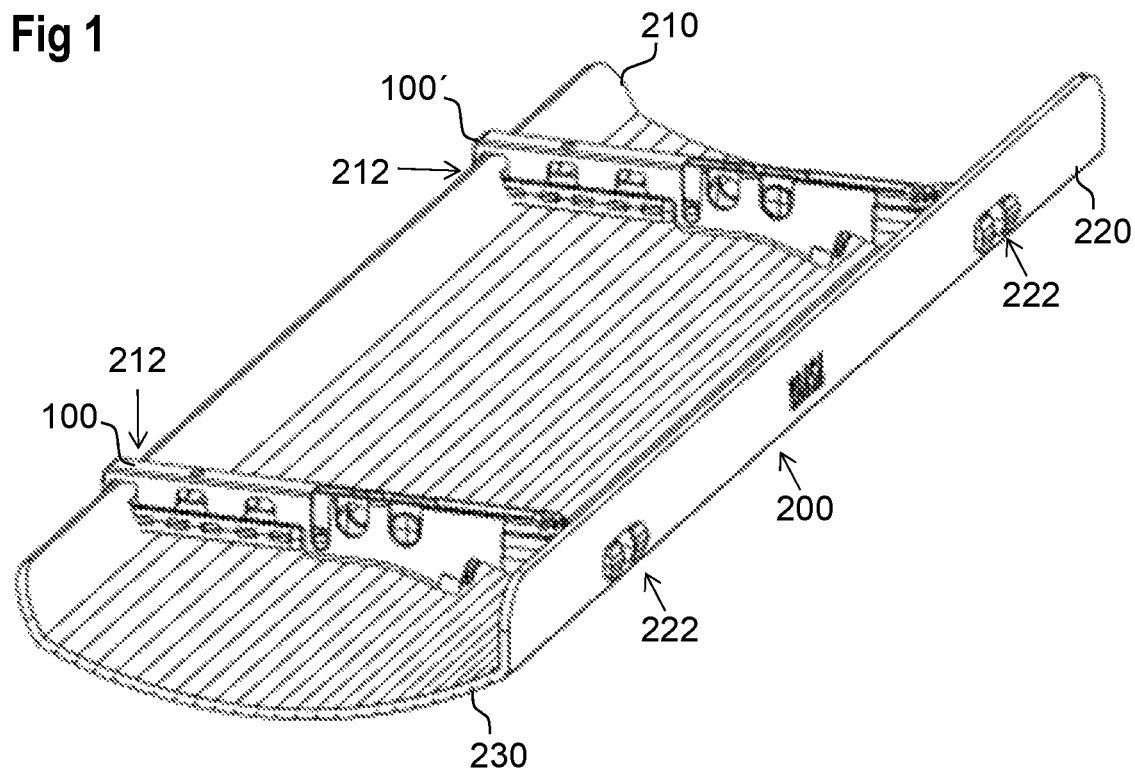
FIG. 1 is a perspective view of an exemplary embodiment of a cable management system.

FIG. 1 shows an exemplary embodiment of a cable management system for a worktop, which comprises at least one support mechanism 100, 100' and an areal cable support 200. In the embodiment shown, the cable management system is formed with two cable support mechanisms 100, 100', wherein, depending on the length of the cable support 200, a single support mechanism or a higher number of support mechanisms is also possible.

The support mechanisms 100, 100' are elongated between a first end and a second end along a major axis. They each comprise a connection to the cable support, in particular in a first edge region 210 of the cable support 200 and a second edge region 220. For this purpose, the cable support 200 comprises, for example, corresponding openings 212 in the first edge region 210 and openings 222 in the second edge region 220. A central region 230 of the cable support 200 is provided, for example, for storing cables or the like which are required at a workstation.

Figure 2:
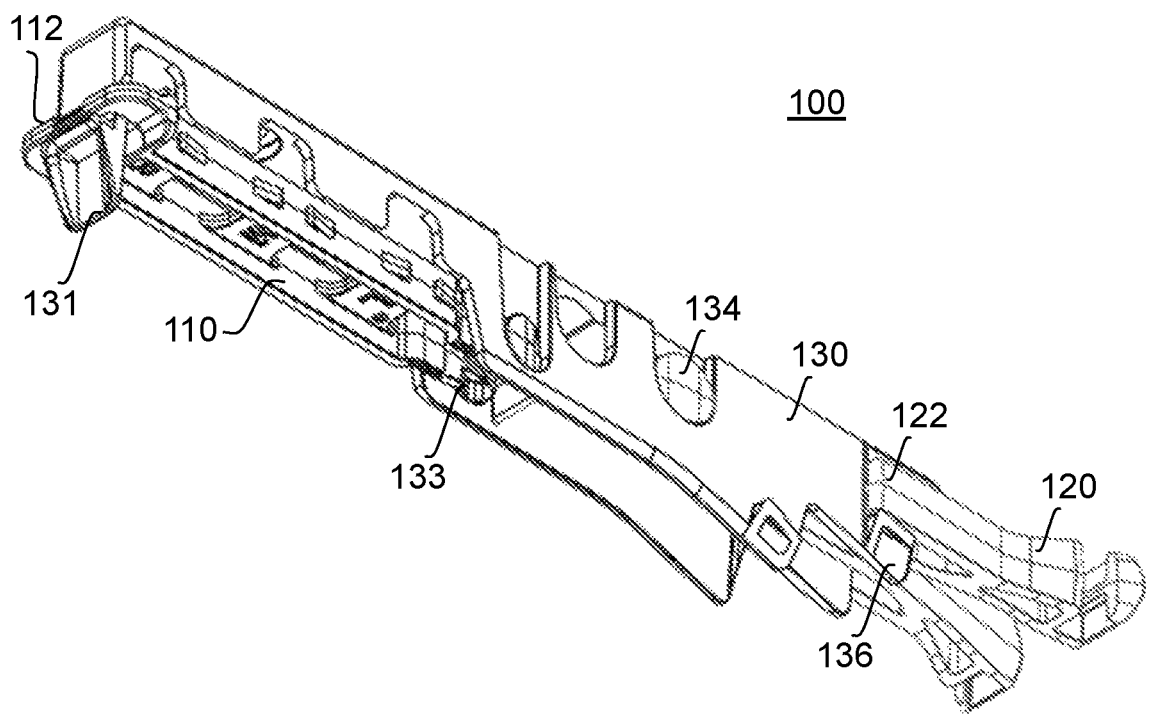
FIG. 2 is a perspective view of an exemplary embodiment of a support mechanism.

In the following, the structure of the support mechanisms 100 will be described with reference to various exemplary embodiments. With reference to FIG. 2, a support mechanism 100 is shown there with a base body 130 as well as a first lever 110 and a second lever 120. More detailed illustrations are shown for the base body 130 in FIG. 3, for the first lever 110 in FIG. 4 and for the second lever 120 in FIG. 5.

With reference to FIG. 2, for example, the first lever 110 is supported at a proximal end at a first pivot point 133 and is fixed or fixable at a distal end at a first fixation point 131. Similarly, the second lever 120 is supported at a proximal end at a second pivot point 134. In this case, a flexible portion 122 of the second lever 120 rests on a second fixation point 136 that holds the second lever 120 in the corresponding position.

For example, the proximal ends of the levers 110, 120 or the pivot points 133, 134 are located in a central region between the two ends of the base body 130, while the distal ends of the levers 110, 120 are directed outwards, so to speak. This is particularly true for the fixed state of the levers 110, 120.

In alternative embodiments, a proximal end of one of the levers may also face the distal end of the other lever. For example, only the proximal end of the second lever 120 is arranged in a central region between the two ends of the base body 130, while the proximal end of the first lever 110 is supported in the region of the first end of the base body. As a further alternative, the distal ends of the levers may also face each other.

In particular, in the implementation shown in FIG. 2, the fixation point 131 and the distal end of the first lever 110 with a counterpart form a retaining device 112, in this case in the form of a snap connection, which can be closed or fixed and released with little effort. The corresponding parts 131 and 112 of the snap connection can be seen even more clearly in FIGS. 3 and 4, for example.

Figure 3:
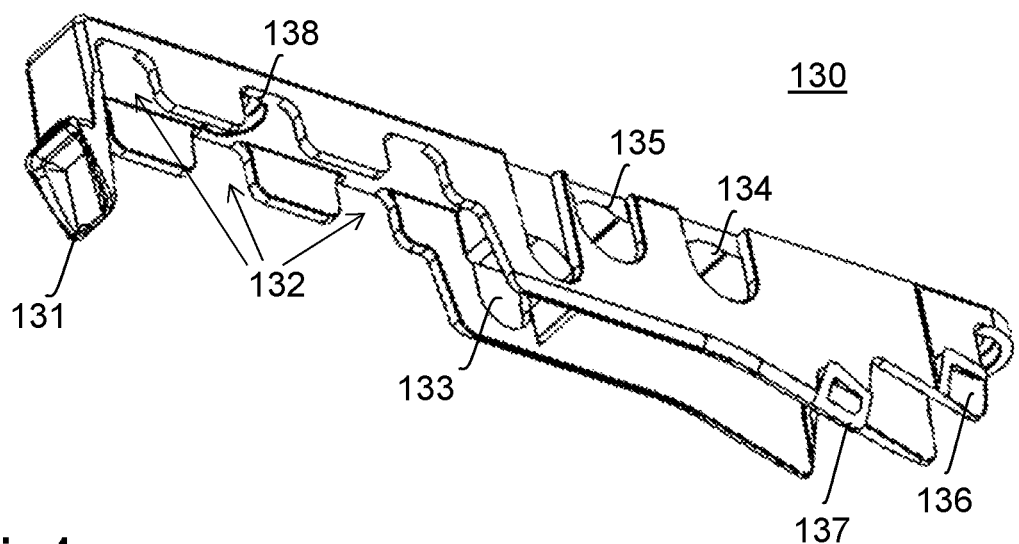
FIG. 3 is a perspective view of an exemplary embodiment of a base body of the support mechanism.

With reference to FIG. 3, the base body 130 is shown there as an individual part. Here it can be seen that, in addition to the second pivot point 134, an optional further pivot point 135 is also provided which, like the second pivot point 134, is capable of accommodating the second lever as an alternative pivot point, so to speak. Accordingly, a further fixation point 137 is also provided which, in a similar function to the fixation point 136, allows the flexible portion 122 of the second lever 120 to rest thereon. Preferably, the fixation points 136, 137 are formed symmetrically with respect to the major axis of the base body 130, wherein they are not visible in the present embodiment.

The base body 130 further comprises a mounting arrangement 138 with which the base body 130 or the support mechanism 100, respectively, can be fixed to a worktop. For example, the mounting arrangement 138 is provided for receiving a screw connection that fixes the base body 130 of a worktop. Another such mounting arrangement is located, for example, at a corresponding location between the pivot point 134 and the corresponding second end of the base body, but this is not visible for illustration reasons.

In this embodiment, the base body 130 further comprises three recesses 132 which serve to receive the first edge region 210 of the cable support 200. This can be seen by way of example in FIG. 1, but will be explained in more detail below, in particular in connection with FIGS. 6A to 6C.

Figure 4:
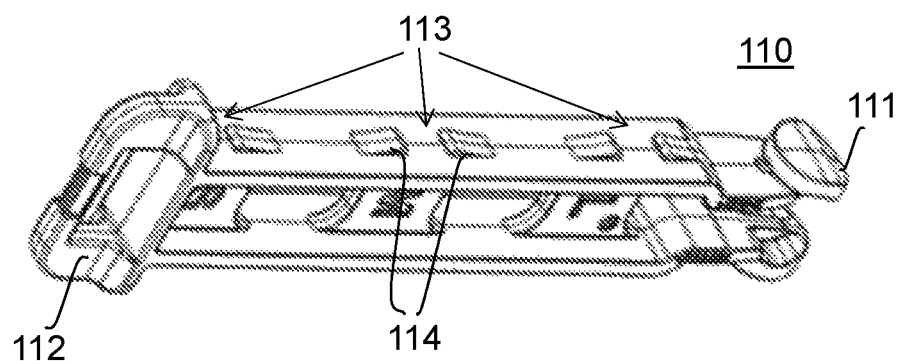
FIG. 4 is a perspective view of an exemplary embodiment of a first lever of one of the support mechanisms.

FIG. 4 shows the first lever 110, which comprises at a proximal end a pivot mechanism 111 that is receivable in the pivot point 133 or, as shown in FIG. 2, is received therein. The pivot mechanism 111 is designed, for example, in such a way that insertion or removal from the pivot point 133 is possible by squeezing the rounded pivot mechanism 111. Accordingly, the rounding enables rotation in the pivot point 133.

In this exemplary embodiment, the first lever further comprises three retaining portions 113 which serve to receive the cable support 200. This can be seen, for example, from FIG. 1 and will be explained in more detail in connection with FIGS. 6A to 6C. The retaining portions 113 are formed, for example, by corresponding stoppers 114 which comprise a ramp-shaped, wedge-shaped or sawtooth-shaped form. This allows an opening, in particular the opening 212 of the cable support 200, to be brought into these retaining portions 113 with little effort and, due to the shape of the stoppers 114, to prevent the cable support 200 from moving on the first lever 110.

Figure 5:
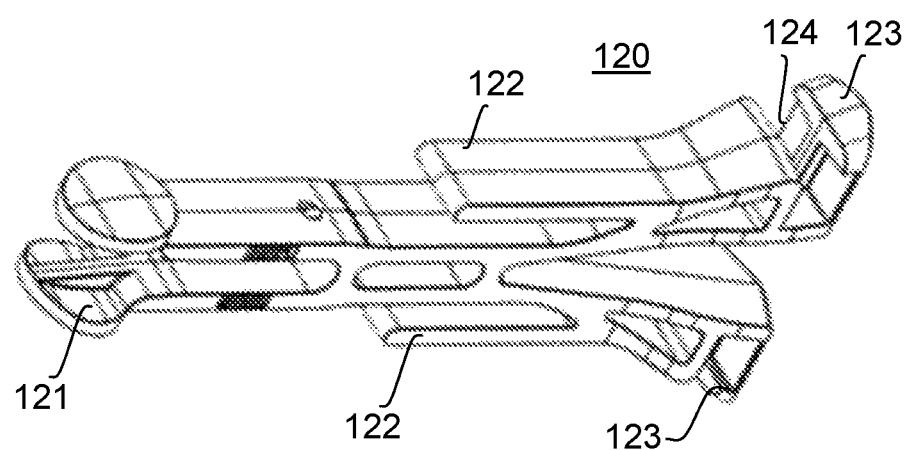
FIG. 5 is a perspective view of an exemplary embodiment of a second lever of the support mechanism.

FIG. 5 shows an exemplary embodiment of a second lever 120, which in turn comprises a corresponding pivot mechanism 121 at a proximal end, the function of which corresponds substantially to the pivot mechanism 111 of the first lever 110. In particular, by squeezing the pivot mechanism 121, the second lever can be switched between or anchored at the second and third pivot points 134, 135. Again, the round shape of the pivot mechanism 121 enables rotation in the corresponding pivot point 134, 135.

FIG. 5 also shows more clearly the flexible parts 122 of the second lever 120, which can rest on the support of the fixation point 136, as shown in FIG. 2. As mentioned above, the second lever 120 can also be changed from the pivot point 134 to the pivot point 135, wherein a resting on the fixation point 137 then occurs.

At a distal end, the second lever 120 comprises a release 123 which, particularly when compressed, causes movement of the flexible portion 122 to move the second lever 120 from a fixed position.

At the distal end of the second lever 120 there is also the second retaining portion 124 in which the cable support 200 is or can be received, in particular through the opening 222.

The function of the individual components of the support mechanism 100 or of the base body 130 and of the first and second levers 110, 120 will be explained in more detail below with reference to various application examples.

FIGS. 6A to 6C accordingly show the cable management system in various possible forms of application. In particular, different variations are shown for how the cable support 200 can be attached differently to the first lever 110. In addition, the embodiment of the cable support 200 can be seen more clearly in these views. In particular, it can be seen that a plurality of parallel slots 232 are provided in the central region 230 on the outer side of the cable support 200, i.e. a side facing away from the support mechanism, which slots are preferably evenly spaced. With reference to FIG. 1, these slots preferably extend along the full length of the cable support, but do not penetrate the cable support 200.

In this case, the cable support 200 is formed, for example, from a rigid material, in particular a material that is resistant to bending, which ensures a high degree of stability but basically permits uniform bending. The slots 232 in the central region 230 allow the cable support 200 to be rolled up in the transverse direction as shown, but nevertheless do not permit bending or the like in the longitudinal direction, i.e. perpendicular to the major axis of the mounting mechanisms. The edge regions 210, 220 are designed without slots and are accordingly rigid. The material chosen is, for example, a felt material, in particular a plastic felt material. Other embodiments of the cable support 200 are not excluded, as long as, for example, longitudinal stability is provided with concurrent flexibility in the transverse direction. This can be achieved, for example, by lamellar or link structures in which the cable support 200 is formed from several individual parts, or similar embodiments.

In the illustrations in FIGS. 6A to 6C, the second edge portion 220 is accommodated in the second retaining portion 124, as in FIG. 1. In contrast, the position of the first edge region 210 on the first lever 110 varies in the different figures.

In FIG. 6A, the cable support 200 or the first edge portion 210 is received in an outer retaining portion 113 of the first lever 110, providing a small volume for receiving cables or other objects on the cable support 200.

In the embodiment of FIG. 6B, the first edge portion 210 is received in a central retaining portion 113 of the first lever 110, providing a medium volume for receiving cables and the like.

In FIG. 6C, the first edge portion 210 is received in a retaining portion 113 closest to the pivot mechanism 111, resulting in a large volume for receiving cables and the like.

In all three options, the portion of the edge portion 210 that extends beyond the corresponding retaining portion 113 on the first lever 110 extends into a corresponding recess 132 in the base body 130.

The various retaining positions 113 provide flexibility for the user of the cable management system, as the volume for holding cables and the like on the cable support 200 can be varied according to the needs of the user or the application.

While in the embodiment shown there are three different holding positions for the cable support on the first lever, this number can also be varied as desired. In principle, it is possible for only one retaining portion to be provided on the first lever 110, but it is also possible to provide two or four or more retaining portions, depending on the application.

Figure 7A:
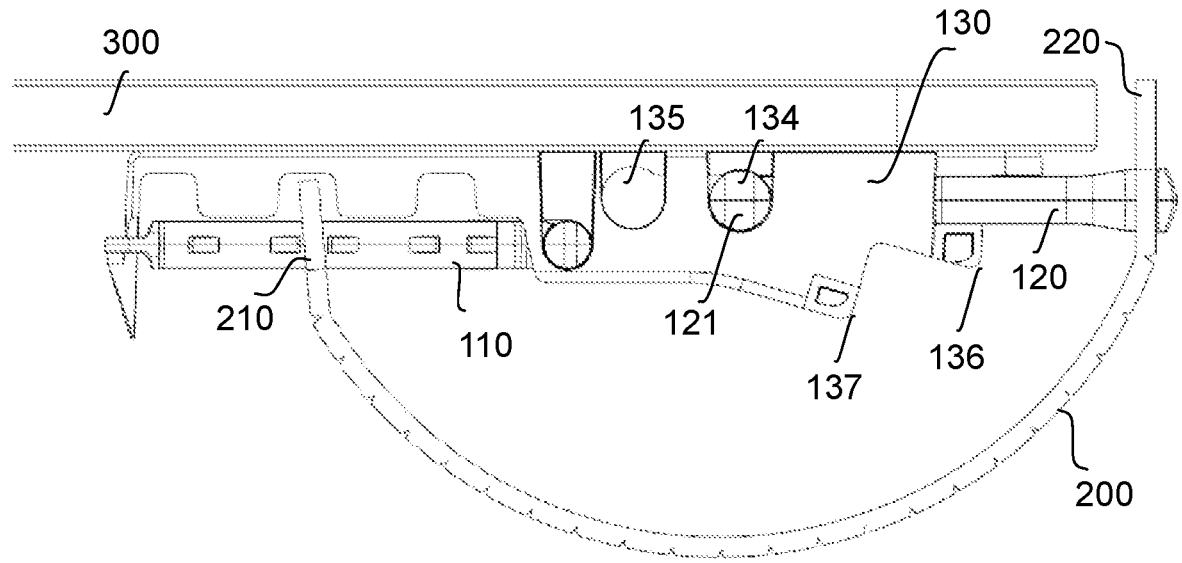
FIGS. 7A and 7B are front views of an exemplary cable management system showing various configurations on a worktop.
Figure 7B:
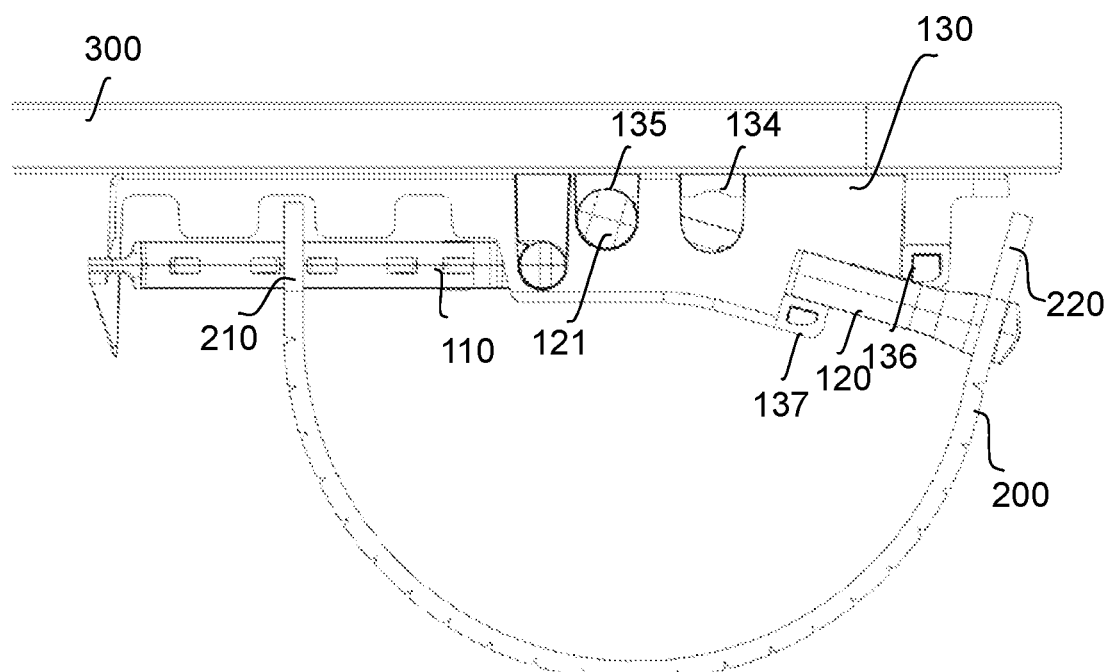

FIGS. 7A and 7B illustrate the cable management system in conjunction with a worktop 300 in two different possible configurations, between which it is readily possible to switch during operation. In particular, an attachment of the support mechanism 100 or the base body 130 to the worktop remains unchanged. Similar to the illustration of FIG. 6B, the first edge portion 10 is located in the central retaining portion of the first lever 110.

In FIG. 7A, the second lever 120 with its pivot mechanism 121 is supported in the second pivot point 134 and rests on the fixation point 136. Here, the second lever 120 is nearly parallel to the surface of the countertop 300 and extends beyond the edge of the worktop 300. For example, the second edge portion 220 is received in the second lever 120 such that the top edge of the cable support 200 is more or less flush with the top edge of the worktop 300. This provides both an improved appearance and ease of routing cables from the cable support area to the worktop 300.

In the configuration shown in FIG. 7B, the second lever 120 with its pivot mechanism 121 is received in the third pivot point 135, which is located further inward with respect to the edge of the table. In addition, the second lever 120 rests on the third fixation point 137. In this case, the second lever 120 is no longer parallel to the surface of the worktop 300, but is inclined downwards to a certain degree. The inward positioning of the pivot point in conjunction with the greater inclination results in the second lever 120 and the second end region 220 being located completely below the worktop 300.

The same arrangement can thus be used in a flexible manner to accommodate various desired configurations.

Figure 8A:
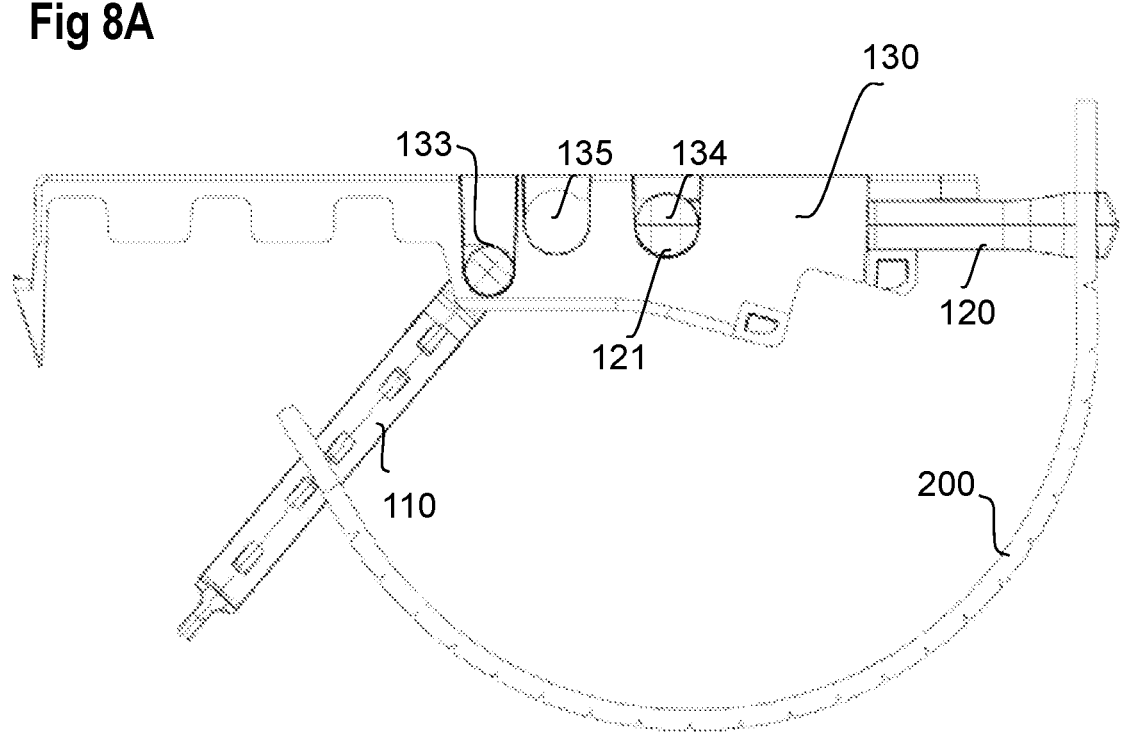
FIGS. 8A and 8B are front views of an exemplary cable management system showing various further configurations thereof.
Figure 8B:
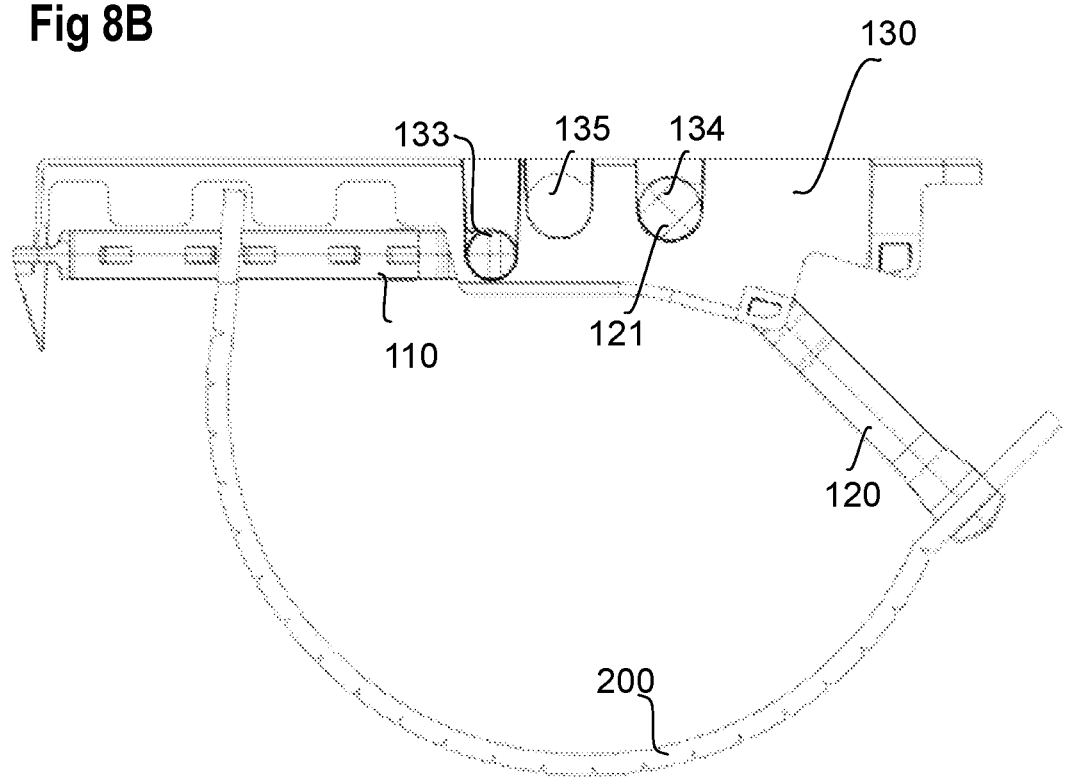

FIGS. 8A and 8B illustrate various operating conditions of the cable management system in an example configuration. In each case, the first lever 110 is movably or pivotally mounted in the first pivot point 133, while the second lever 120 with its pivot mechanism 121 is mounted in the second pivot point 134. The cable support 200 is received on the first lever 110 in the central retaining position, as also shown, for example, in FIG. 6B. The other retaining positions on the first lever 110 can of course be selected alternatively.

In the illustration of FIG. 8A, the second lever 120 is engaged, i.e. rests on the fixation point. In contrast, the first lever 110 is in an open position, i.e. not fixed, so that the cable support 200 is accessible from the first, inner side.

In contrast, in FIG. 8B, the first lever 110 is in the fixed position, while the second lever 120 is not fixed and therefore allows access to the cable support from the second, outer side.

Figure 9:
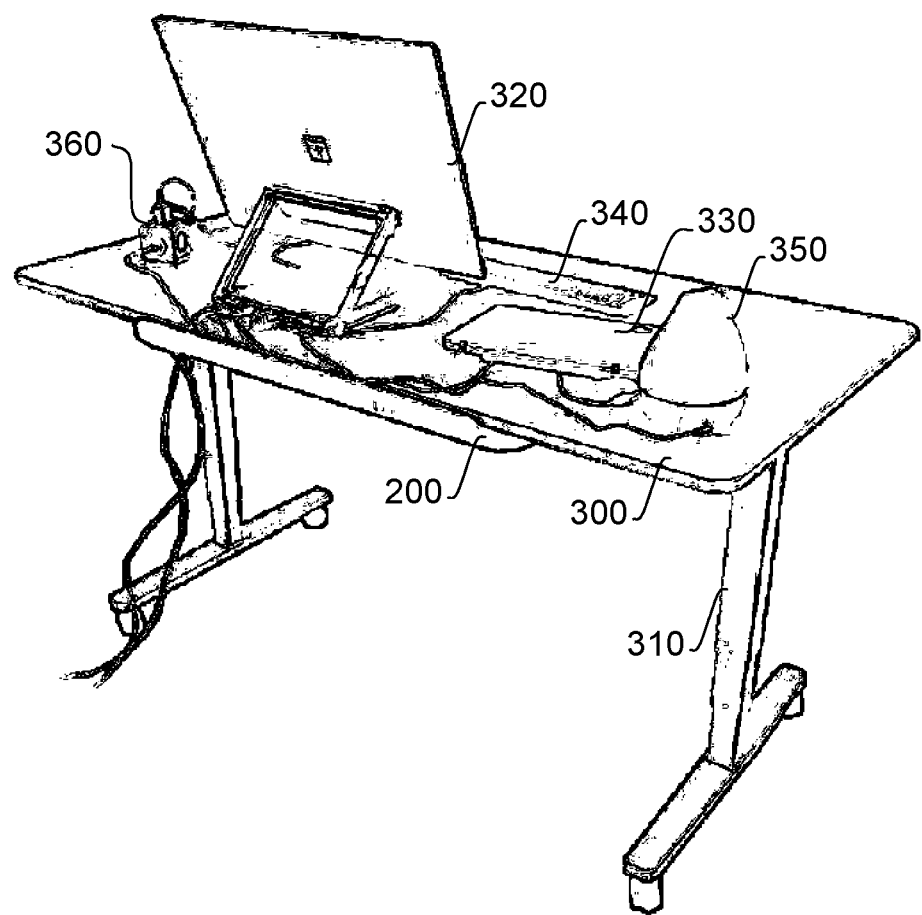
FIG. 9 is a perspective view of an example of a workstation system.

FIG. 9 shows an exemplary embodiment of a workstation system with a worktop 300 mounted on a table frame 310 and a cable management system according to one of the embodiments described above, of which only the cable support 200 is visible for illustration reasons. Here, for example, the cable management system is shown in an "over the edge" configuration, which was explained in more detail in connection with FIG. 7A. Exemplary components on the workstation system are shown to illustrate the possible routing of cables into the cable management system, such as a monitor 320, a notebook computer 330, a keyboard 340, a workstation lamp 350, and a multiple socket outlet 360.

The ability to open the cable management system from both sides allows for flexibility in use, even in different configurations of the workstation. For example, if the workstation is positioned with the second side, i.e. the side to which the second lever is directed, against the wall, there still remains the possibility to reach the cable support by opening the first side. In the case of a free-standing workstation, it may be more convenient to perform the opening of the cable management system via the second lever, so as not to use the access from the first side below the worktop.

In its various embodiments, the cable management system offers visually appealing organization of the cables in each case. In addition, flexible functionality is also provided for widely varying "cable densities" at the table, for example, by adjusting the capacity of the cable stowage, which enables use both at a CAD workstation as one extreme example and with a tablet as another extreme example. Basically, the cables are secured against getting caught on obstacles. The cable management system in the embodiments described also enables easy assembly of the system. Operation, in particular accessibility and convenience of cable stowage, is also provided in all embodiments.

The invention claimed is:

1. A cable management system for a worktop, the cable management system comprising:
   an areal cable support configured to contact one or more cables; and
   at least one support mechanism, wherein the at least one support mechanism comprises:
      a first lever comprising at least a first retaining portion configured for selectively receiving the areal cable support;
      a second lever comprising at least a second retaining portion configured for selectively receiving the areal cable support; and
      a base body extending between a first end and a second end along a major axis, wherein the base body comprises:
         a first pivot point, wherein the first lever is selectively pivotally supported in the first pivot point at a first proximal end of the first lever;
         a second pivot point, wherein the second lever is selectively pivotally supported in the second pivot point at a second proximal end of the second lever;
         a first fixation point, wherein the first lever is selectively fixed to the base body at the first fixation point; and
         a second fixation point, wherein the second lever is selectively fixed to the base body at the second fixation point.

2. The cable management system according to claim 1, wherein:
   the first proximal end of the first lever faces the second proximal end of the second lever;
   a first distal end of the first lever faces the first end of the base body; and
   a second distal end of the second lever faces the second end of the base body.

3. The cable management system according to claim 1, wherein the first lever comprises at least one further retaining portion configured for selectively receiving the areal cable support, wherein the at least one further retaining portion is spaced apart from the first retaining portion.

4. The cable management system according to claim 3, wherein the first retaining portion or the at least one further retaining portion comprise at least one stopper configured for preventing displacement of the areal cable support with respect to the first lever.

5. The cable management system according to claim 3, wherein the base body comprises one or more recesses defined in a respective region of the base body corresponding to the at least one first retaining portion and the at least one further retaining portion when the first lever is fixed to the base body.

6. The cable management system according to claim 1, wherein the first retaining portion comprises at least one stopper configured for preventing displacement of the areal cable support with respect to the first lever.

7. The cable management system according to claim 1, wherein the base body comprises a recess defined in a region of the base body corresponding to the first retaining portion when the first lever is fixed to the base body.

8. The cable management system according to claim 1, further comprising a first retaining device for selectively fixing a first distal end of the first lever to the first fixation point of the base body, wherein the first retaining device comprises a snap connection device having a first snap member defined by the first fixation point and a second snap member defined by the first distal end of the first lever.

9. The cable management system according to claim 1, wherein the second fixation point comprises a support defined on the base body, wherein the second lever comprises a flexible member, and wherein the flexible member is configured to selectively engage the support based on a compression of the flexible member, thereby selectively fixing the second lever to the base body at the second fixation point.

10. The cable management system according to claim 1, wherein the areal cable support comprises an edge region having one or more openings defined therein, wherein one or more of the first retaining portion of the first lever and the second retaining portion of the second lever selectively receive the one or more openings, respectively.

11. The cable management system according to claim 1, wherein the areal cable support is formed of a bending-resistant material and comprises a plurality of parallel slots in a central region thereof, wherein the plurality of parallel slots are aligned substantially perpendicularly to the major axis.

12. The cable management system according to claim 1, wherein the base body comprises a mounting arrangement for mounting the support mechanism to the worktop.

13. The cable management system according to claim 1, comprising at least two support mechanisms.

14. The cable management system according to claim 1, wherein the base body further comprises:
a third pivot point, wherein the second lever is selectively pivotally supported in the third pivot point at the second proximal end of the second lever; and
a third fixation point, wherein the second lever is selectively fixed to the base body at the third fixation point.

15. The cable management system according to claim 14, wherein a first angle defined between the major axis and a first line connecting the second pivot point and the second fixation point is different from a second angle between the major axis and a second line connecting the third pivot point and the third fixation point.

16. The cable management system according to claim 1, further comprising a workstation system comprising the worktop, wherein the areal cable support or the at least one support mechanism is attached to the worktop.

17. The cable management system according to claim 16, wherein the base body comprises:
a third pivot point, wherein the second lever is selectively pivotally supported in the third pivot point at the second proximal end of the second lever; and
a third fixation point, wherein the second lever is selectively fixed to the base body at the third fixation point, wherein the second lever is positionable in a first configuration and a second configuration with respect to the base body, wherein:
in the first configuration, the second lever is supported in the second pivot point and, when the second lever is fixed at the second fixation point, the areal cable support protrudes beyond a lateral edge of the worktop; and
in the second configuration, the second lever is supported at the third pivot point and, when the second lever is fixed at the third fixation point, the areal cable support is located below the worktop.

18. The cable management system according to claim 16, wherein:
the first and second proximal ends of the respective first and second levers face each other;
a first distal end of the first lever faces the first end of the base body; and
a second distal end of the second lever faces the second end of the base body.

19. A cable management system for a worktop, the cable management system comprising:
a cable support configured to contact one or more cables along a length thereof; and
at least one support mechanism, wherein the at least one support mechanism comprises:
a first lever comprising at least a first retaining portion configured for selectively receiving the cable support;
a second lever comprising at least a second retaining portion configured for selectively receiving the cable support; and
a base body extending between a first end and a second end along a major axis, wherein the base body comprises:
a first pivot point, wherein the first lever is selectively pivotally supported in the first pivot point at a first proximal end of the first lever;
a second pivot point, wherein the second lever is selectively pivotally supported in the second pivot point at a second proximal end of the second lever;
a first fixation point, wherein the first lever is selectively fixed to the base body at the first fixation point; and
a second fixation point, wherein the second lever is selectively fixed to the base body at the second fixation point.

20. A cable management system for a worktop, the cable management system comprising:
an areal cable support having a support surface configured for contacting one or more cables; and
at least one support mechanism, wherein the at least one support mechanism comprises:
a first lever comprising at least a first retaining portion configured for selectively receiving the areal cable support;
a second lever comprising at least a second retaining portion configured for selectively receiving the areal cable support; and
a base body extending between a first end and a second end along a major axis, wherein the base body comprises:
a first pivot point, wherein the first lever is selectively pivotally supported in the first pivot point at a first proximal end of the first lever;
a second pivot point, wherein the second lever is selectively pivotally supported in the second pivot point at a second proximal end of the second lever;
a first fixation point, wherein the first lever is selectively fixed to the base body at the first fixation point; and
a second fixation point, wherein the second lever is selectively fixed to the base body at the second fixation point.

* * * * *